US008811376B2

(12) United States Patent
Nishimura

(10) Patent No.: US 8,811,376 B2
(45) Date of Patent: Aug. 19, 2014

(54) PACKET TRANSMITTING APPARATUS AND NETWORK SYSTEM

(75) Inventor: Kazuto Nishimura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1383 days.

(21) Appl. No.: 11/934,236

(22) Filed: Nov. 2, 2007

(65) Prior Publication Data

US 2008/0130650 A1 Jun. 5, 2008

(30) Foreign Application Priority Data

Dec. 4, 2006 (JP) ................................. 2006-327415

(51) Int. Cl.
*H04L 12/701* (2013.01)
*H04L 12/707* (2013.01)
*H04L 12/56* (2006.01)

(52) U.S. Cl.
CPC ................. *H04L 45/00* (2013.01); *H04L 45/22* (2013.01); *H04L 49/351* (2013.01); *H04L 49/555* (2013.01)
USPC ........... 370/351; 370/217; 370/218; 370/242; 370/419; 709/238; 709/239

(58) Field of Classification Search
USPC ......................................... 370/401, 419, 256
See application file for complete search history.

(56) References Cited

U.S. PATENT DOCUMENTS

| 5,172,372 | A | 12/1992 | Konishi | |
|---|---|---|---|---|
| 2002/0107980 | A1* | 8/2002 | Kawaguchi | 709/238 |
| 2002/0136164 | A1* | 9/2002 | Fukuda et al. | 370/230 |
| 2002/0147800 | A1* | 10/2002 | Gai et al. | 709/221 |
| 2003/0016624 | A1* | 1/2003 | Bare | 370/217 |
| 2003/0142685 | A1* | 7/2003 | Bare | 370/410 |
| 2003/0208618 | A1* | 11/2003 | Mor et al. | 709/238 |
| 2004/0047300 | A1* | 3/2004 | Enomoto et al. | 370/256 |
| 2004/0162684 | A1* | 8/2004 | Reynolds et al. | 702/69 |
| 2004/0225725 | A1* | 11/2004 | Enomoto et al. | 709/220 |
| 2005/0041590 | A1* | 2/2005 | Olakangil et al. | 370/238 |
| 2005/0141537 | A1* | 6/2005 | Kumar et al. | 370/429 |
| 2006/0104271 | A1* | 5/2006 | Samudra | 370/389 |
| 2006/0126517 | A1* | 6/2006 | Kurosaki et al. | 370/241 |
| 2006/0171302 | A1* | 8/2006 | Tallet | 370/225 |
| 2007/0223478 | A1* | 9/2007 | Nishimura et al. | 370/392 |
| 2007/0274295 | A1* | 11/2007 | Nishimura et al. | 370/352 |

FOREIGN PATENT DOCUMENTS

JP 4-040032 2/1992

* cited by examiner

*Primary Examiner* — Ayaz Sheikh
*Assistant Examiner* — Tarell Hampton
(74) *Attorney, Agent, or Firm* — Katten Muchin Rosenman LLP

(57) ABSTRACT

A packet transmitting apparatus according to the present invention includes a plurality of ports. When the same unlearned packets have arrived at the plurality of ports, the packet transmitting apparatus judges through packet processing section that the first arrived one of the packets is a previous arrival packet. Then, through previous arrival group judging section, the packet transmitting apparatus selects from the plurality of ports a plurality of ports satisfying a previous arrival port condition for determining a port at which the previous arrival packet arrives as a previous arrival port. The packet transmitting apparatus judges the thus selected plurality of ports as the previous arrival ports having an equal previous arrival characteristic of packets, and includes the ports in a previous arrival port group.

18 Claims, 12 Drawing Sheets

FIG. 10

| MAC | ARRIVAL NUMBER | DIFFERENCE OF AVERAGE ARRIVAL TIME | | |
|---|---|---|---|---|
| | | p1 | p2 | p3 |
| x | 2 | 0 | +10 | +90 |
| b | 3 | +30 | 0 | – |
| ... | ... | | | |

| FIXED NUMBER |
|---|
| 3 |

| FIXED TIME |
|---|
| +50 |

FIG. 11

| MAC | ARRIVAL NUMBER | NUMBER OF PACKET | | |
|---|---|---|---|---|
| | | p1 | p2 | p3 |
| x | 20 | 9 | 8 | 3 |
| b | 13 | 0 | 13 | 0 |
| ... | ... | | | |

| FIXED NUMBER |
|---|
| 20 |

| FIXED RATIO |
|---|
| 50% |

PACKET TRANSMITTING APPARATUS AND NETWORK SYSTEM

BACKGROUND OF THE INVENTION

1. Field of the Invention

The present invention relates to a packet transmitting apparatus and a network system.

2. Description of the Related Art

In recent years, a wide-area Ethernet service has been spreading. As one of standard protocols of the Ethernet, there is a Spanning Tree Protocol (STP). The STP is for logically invalidating some ports of a physical loop existing in a network to prevent the passage of a packet, to thereby establish a logical tree network.

In some logical tree structures, therefore, a packet transmission path between different terminals connected to the network may not be an optimal path, but may be an indirect path. Further, with some ports invalidated, some paths of the physical loop structure cannot be used. As a result, there arises a problem that a load cannot be dispersed.

Furthermore, a packet transmitting apparatus disposed at each of nodes of the network performs software processing, such as the generation and interpretation of a Bridge Protocol Data Unit (BPDU). Thus, there is a problem in that a load on a Central Processing Unit (CPU) of each packet transmitting apparatus is increased. As a measure to solve the above problems, an extended form of the STP called Multiple Spanning Tree Protocol (MSTP) has been conceived of.

According to the MSTP, a plurality of trees are established in the network, and a different tree is used for each Virtual Local Area Network (VLAN) to disperse the load. However, a similar problem to the problem of the STP described above occurs also in the MSTP among terminals included in the same VLAN.

Further, the packet transmitting apparatus disposed at each of the nodes processes information of the plurality of trees. Thus, there is a problem in that the load on the CPU is further increased. Furthermore, if a trouble occurs in the CPU, the protocol may not operate as desired, and thus a loop may be formed.

Still further, in the STP and the MSTP, the BPDU is abandoned after having passed through a fixed number of nodes, e.g., twenty nodes. Thus, there is a problem of scalability in that a network of a larger scale cannot be established. As a measure to solve the above-described various problems of the STP and the like, there is a so-called previous arrival port learning system for learning, as the port on the optimal path, a port of the packet transmitting apparatus of each node at which a packet first arrives.

FIG. 12 is a diagram for explaining an outline of a conventional previous arrival port learning system. As illustrated in FIG. 12, firstly, an unlearned packet 6 addressed to a terminal L2 arrives from a terminal K1 at the first port of a packet transmitting apparatus 4 of a node B. The packet transmitting apparatus 4 of the node B transmits the packet to next destinations from the ports of the apparatus other than the port at which the packet has arrived (the second and third ports in the illustrated example). The packet transmission from the ports other than the arrival port is hereinafter referred to as flooding.

The unlearned packet herein refers to a packet, the optimal path for which has not been learned, since a packet of the same source-destination combination as the source-destination combination of the unlearned packet has not arrived at a node. In a packet transmitting apparatus 3 of a node A, a packet 7 transmitted from the node B arrives at the first port of the apparatus.

If the packet 7 is unlearned at the node A, the packet transmitting apparatus 3 of the node A transmits the packet to a next destination from the port other than the port at which the packet has arrived (the second port in the illustrated example). In the above process, the packet transmitting apparatus 3 of the node A learns the port at which the unlearned packet first arrived (hereinafter referred to as the previous arrival port), in association with a source Media Access Control (MAC) address of the packet.

In some cases, the same packet as the packet which has arrived at the previous arrival port (hereinafter referred to as the previous arrival packet) arrives at a not-illustrated port of the packet transmitting apparatus 3 of the node A later than the arrival of the packet 7 at the previous arrival port (hereinafter referred to as the later arrival packet). In this case, the packet transmitting apparatus 3 of the node A abandons all later arrival packets. In a packet transmitting apparatus 5 of a node C, a packet 8 transmitted from the node B first arrives at the second port of the apparatus, and then a packet 9 transmitted from the packet transmitting apparatus 3 of the node A arrives at the third port of the apparatus.

The packet transmitting apparatus 5 of the node C transmits a packet 10 to the terminal L2 from the port of the apparatus other than the ports at which the previous arrival packet 8 and the later arrival packet 9 have arrived (the first port in the illustrated example). Then, the packet transmitting apparatus 5 of the node C abandons the later arrival packet 9. Further, the packet transmitting apparatus 5 of the node C registers the previous arrival port and the source MAC address of the previous arrival packet 8 in a MAC address table 11 of the apparatus, with the previous arrival port and the source MAC address associated with each other. Thereby, the relationship between the MAC address of a terminal and the port used to transmit a packet addressed to the terminal has been learned at each of the nodes.

When a packet addressed to the terminal K1 arrives from the terminal L2 at the node C, the packet transmitting apparatus 5 of the node C refers to the MAC address table 11, similarly as in a normal Ethernet switch. In the MAC address table 11, there is an entry of x as the MAC address of the terminal K1, and the second port is registered as the port to be used, as illustrated in FIG. 12. Therefore, the packet addressed to the terminal K1 is a learned packet. The packet transmitting apparatus 5 of the node C transmits the learned packet from the second port.

An inter-LAN connecting device for determining the optimal path in accordance with the above-described previous arrival port learning system is disclosed in Japanese Unexamined Patent Application Publication No. 4-40032. The device includes: means for registering, upon receipt of a first message relating to a source station and a destination station from a network connected to the device, a first type of address information, which includes the address of the source station and the address of the device, in a corresponding entry in an address conversion table for the source station, and transmitting the received message onto an internal network in a multiaddress mode; and means for registering, when a message received from the internal network is the first message relating to the source station and the destination station, a second type of address information, which includes the address of the source station and the address of a source interface, in a corresponding entry in the address conversion table for the source station, and transmitting the received message onto the network connected to the device.

According to the conventional previous arrival port learning system, however, the port of each of the nodes at which the packet first arrived is registered as the previous arrival port. Thus, the previous arrival port is limited to one port. In some actual cases, however, packets substantially simultaneously arrive at a plurality of ports of a node. According to the conventional system, one of the ports is selected as the previous arrival port also in the above case. Therefore, the conventional system has a problem in that, even if traffic concentrates on a path passing through the selected previous arrival port, a load cannot be dispersed to a path passing through another port.

To solve the above-described problems of the conventional techniques, an object of the present invention is to provide a packet transmitting apparatus having a function of learning the optimal path in accordance with the previous arrival port learning system, in which a plurality of ports can be selected as the previous arrival ports and handled as a previous arrival port group. Further, another object of the present invention is to provide a network system in which a packet transmitting apparatus having the above function is disposed at each of nodes of a network to enable the dispersion of the load caused by the concentration of traffic and so forth.

SUMMARY OF THE INVENTION

A packet transmitting apparatus according to an aspect of the present invention has the following feature. The packet transmitting apparatus includes a plurality of ports, and when the same unlearned packets have arrived at the plurality of ports, the packet transmitting apparatus judges through packet processing section that the first arrived one of the packets is a previous arrival packet. Then, through previous arrival group judging section, the packet transmitting apparatus selects from the plurality of ports a plurality of ports satisfying a previous arrival port condition for judging a port at which the previous arrival packet arrives as a previous arrival port. The packet transmitting apparatus judges the thus selected plurality of ports as the previous arrival ports having an equal previous arrival characteristic of packets, and includes the ports in a previous arrival port group. According to the above aspect of the present invention, the plurality of ports having the equal previous arrival characteristic can be judged as the previous arrival ports.

Herein, the previous arrival port condition is one of the following three conditions. Under a first previous arrival port condition, the previous arrival port group includes a port at which a single unlearned packet has arrived as the previous arrival packet, and a port at which the same packet as the previous arrival packet has arrived within a fixed time since the arrival time of the previous arrival packet. According to the first previous arrival port condition, the previous arrival port group can be easily specified solely with a single packet in terms of the indicator of the time difference.

Under a second previous arrival port condition, the elapsed time since the arrival of the previous arrival packet until the arrival of the same packet as the previous arrival packet is calculated for each of a plurality of unlearned packets having the same source. Then, the average value of the elapsed times of the plurality of packets is calculated for each of the ports. The previous arrival port group includes a port the average value of which is within a fixed time. According to the second previous arrival port condition, the previous arrival port group can be more accurately specified in terms of the indicator of the time difference.

Under a third previous arrival port condition, the number of a plurality of arrived unlearned packets having the same source is calculated for each of the ports, and the ratio of the number of the arrived packets of each of the ports with respect to the number of the arrived packets of the port having the largest number of the arrived packets is calculated. The previous arrival port group includes a port the calculated ratio of which is at least a fixed value. According to the third previous arrival port condition, the previous arrival characteristic does not involve the concept of time measurement. Accordingly, the previous arrival port group can be specified even if the packet transmitting apparatus does not have a function for measuring the time difference.

Further, in the above aspect of the present invention, a plurality of ports are specified in the previous arrival port group as the transmission paths for the same packets. Thus, a path trouble can be judged when a trouble occurs in at least a fixed ratio of the ports included in the previous arrival port group. Thereby, in the event of a trouble state of the same level of seriousness, the path trouble can be judged in the entries relating to all sources.

Alternatively, in place of the ratio of the ports in which a trouble occurs, when a trouble occurs in a fixed number or all of the ports of the previous arrival port group, the path trouble may be judged. In this case, for the entries relating to all sources, the path trouble can be easily judged with the standardized judging criterion. Meanwhile, a network system according to an aspect of the present invention is characterized in that the packet transmitting apparatus of the above-described configuration is disposed at each of a plurality of nodes of a network.

According to the packet transmitting apparatus of the above aspect of the present invention, a plurality of ports can be selected as the previous arrival ports and handled as the previous arrival port group. Therefore, the network system, in which the packet transmitting apparatus is disposed at each of the nodes, exerts an effect of enabling the dispersion of a load increased by the concentration of traffic and so forth.

As described above, the packet transmitting apparatus and the network system according to the above aspects of the present invention are useful in a network system which sets an optimal path between terminals connected to a network in accordance with a previous arrival port learning system. In particular, the packet transmitting apparatus and the network system are suitable for a network system which provides a wide-area Ethernet service with the use of a layer 2 switch or a router.

BRIEF DESCRIPTION OF THE DRAWINGS

FIG. 10 is a diagram illustrating another configuration of the table of the packet transmitting apparatus according to the embodiment of the present invention;

FIG. 11 is a diagram illustrating still another configuration of the table of the packet transmitting apparatus according to the embodiment of the present invention.

DESCRIPTION OF THE PREFERRED EMBODIMENTS

With reference to the accompanying drawings, detailed description will now be made of preferable embodiments of a packet transmitting apparatus and a network system according to the present invention.

Figure 1:
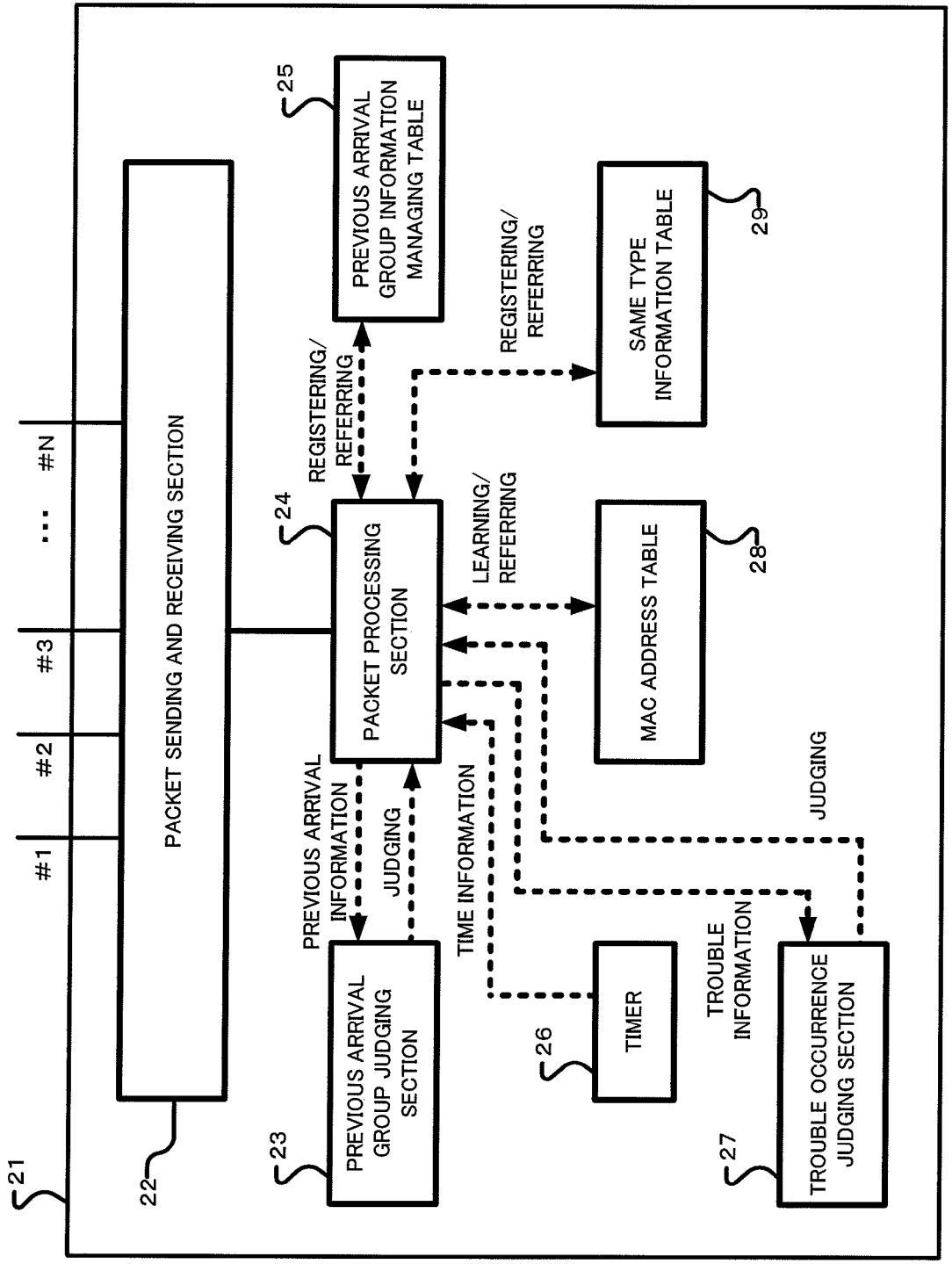
FIG. 1 is a block diagram illustrating a configuration of a packet transmitting apparatus according to an embodiment of the present invention.

FIG. 1 is a block diagram illustrating a configuration of a packet transmitting apparatus according to an embodiment of the present invention. As illustrated in FIG. 1, a packet transmitting apparatus 21 includes a plurality of ports 1 to N, a packet sending and receiving section 22, a previous arrival group judging section 23, a packet processing section 24, a previous arrival group information managing table 25, a timer 26, a trouble occurrence judging section 27, a MAC address table 28, and a same type information table 29.

Each of the ports is connected to the packet sending and receiving section 22 to exchange a packet with an external device. The packet sending and receiving section 22 performs processing relating to the sending and receiving of the packet, such as the capsulation of the packet. The packet sending and receiving section 22 sends the packet processing section 24 a data packet of a main signal received through one of the ports.

The packet processing section 24 performs forwarding processing and same type judging processing of the packet. The forwarding processing is the same as the processing performed with a normal Ethernet switch. That is, in the transmission of the packet which has arrived at one of ports, the packet processing section 24 refers to the MAC address table 28.

If the MAC address table 28 contains an entry of a destination MAC address of the packet, the packet processing section 24 transmits a packet of the transmission target to a port specified by the entry. Meanwhile, if the MAC address table 28 does not contain a corresponding entry, the packet processing section 24 performs flooding of the packet. In the flooding, the main signal packet is not added with any information.

The same type judging processing is processing for judging whether or not the received packet is an already received packet to thereby judge whether the received packet is a previous arrival packet or a later arrival packet. That is, upon arrival of the packet at one of the ports, the packet processing section 24 refers to the same type information table 29.

If information relating to the packet is not registered in the same type information table 29, the packet processing section 24 judges the packet as the previous arrival packet. Then, the packet processing section 24 registers the port at which the previous arrival packet has arrived, in the MAC address table 28, as a previous arrival port. Further, the packet processing section 24 registers the information relating to the previous arrival packet in the same type information table 29.

Meanwhile, if the information relating to the packet is registered in the same type information table 29, the packet is the later arrival packet. Thus, the packet processing section 24 abandons the packet. Herein, as the information relating to the packet registered in the same type information table 29, degeneracy information obtained by a hash function and the like can be used, for example. The above-described processing function of the packet processing section 24 is similar to the function of learning an optimal path in accordance with a conventional previous arrival port learning system.

The previous arrival group information managing table 25 is a table storing information used to determine which one of the plurality of ports should be included in the previous arrival port group. For example, the previous arrival group information managing table 25 stores arrival time information of the previous arrival packet for each source MAC address and fixed time information used to detect the previous arrival port.

On the basis of the information stored in the previous arrival group information managing table 25, the previous arrival group judging section 23 judges which one of the ports should be included in the previous arrival port group. For example, the previous arrival group judging section 23 judges, for a single packet, the port at which the previous arrival packet has arrived and the port at which the later arrival packet has arrived within a fixed time since the arrival time of the previous arrival packet as the previous arrival ports, and includes the thus judged ports in the previous arrival port group.

The fixed time constituting a judging criterion in the above judgment is provided by the fixed time information stored in the previous arrival group information managing table 25. Meanwhile, the elapsed time since the arrival of the previous arrival packet until the arrival of the later arrival packet is obtained by the difference between the arrival time of the later arrival packet and the arrival time of the previous arrival packet.

The arrival time of the previous arrival packet is stored in the previous arrival group information managing table 25. Therefore, the previous arrival group information managing table 25 has the function of managing means for managing the elapsed time until the arrival of the later arrival packet. Further, the arrival times of the respective packets are specified by the timer 26.

When a trouble occurs in at least a fixed ratio of ports out of all ports included in the previous arrival port group, the trouble occurrence judging section 27 judges that the previous arrival port group has a path trouble. The ratio is previously set as a trouble detection threshold value. If the trouble detection threshold value is set at 40%, for example, the judgment is performed as follow.

As for a MAC address including two ports in the previous arrival port group, when a trouble occurs in one of the two ports, the ratio of the port having the trouble (hereinafter referred to as the trouble ports) is 50%, and the path trouble is judged. Meanwhile, as for a MAC address including three ports in the previous arrival port group, when two of the three ports become the trouble ports, the ratio of the trouble ports is 67%, and the path trouble is judged.

Upon judgment of the path trouble by the trouble occurrence judging section 27, the packet processing section 24 performs the same trouble processing as the processing performed with the normal Ethernet switch. That is, the packet processing section 24 deletes a corresponding entry stored in the MAC address table 28, and transmits a control packet or the like to the other nodes to notify the nodes of the occurrence of the trouble.

Figure 2:
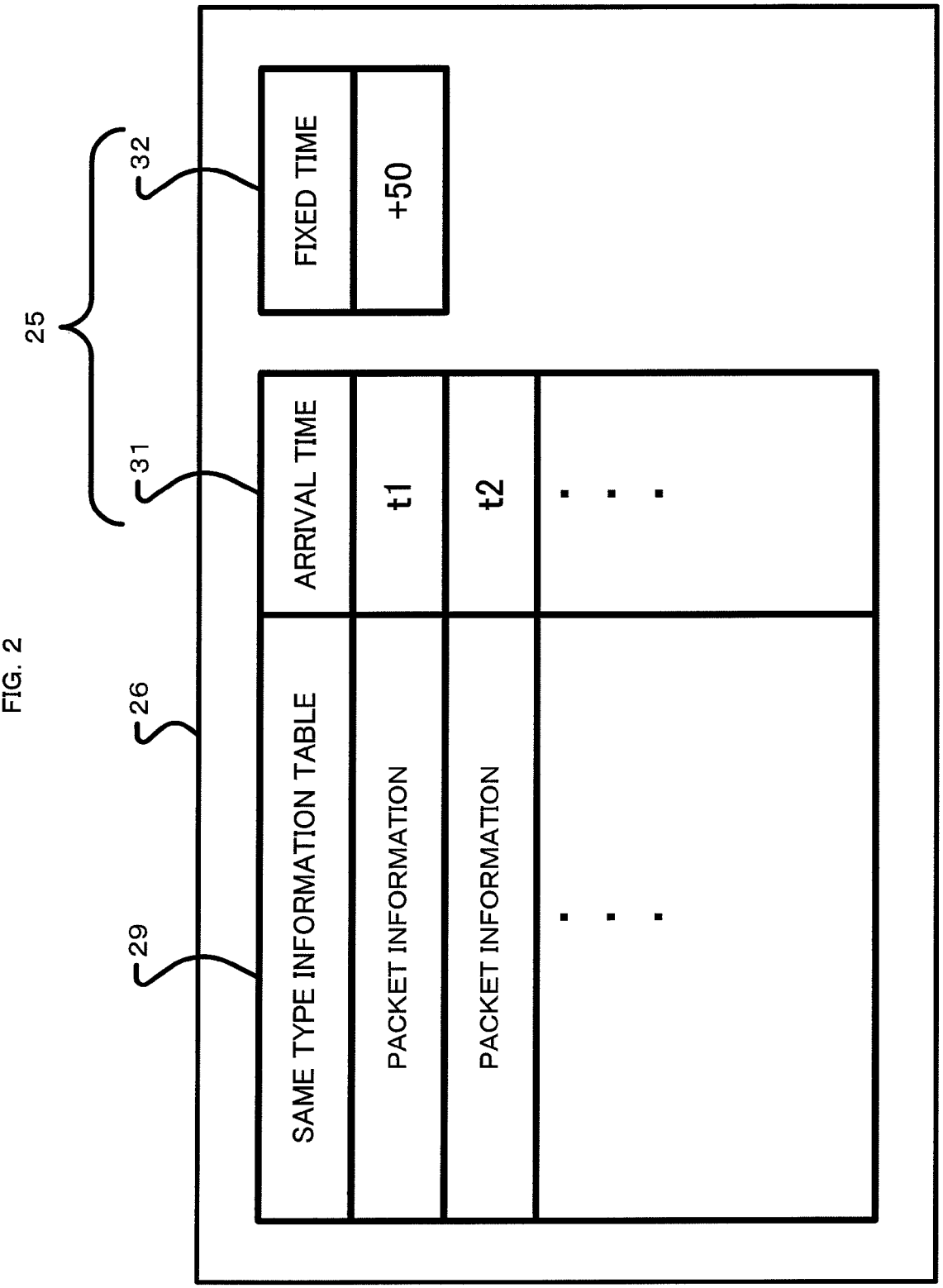
FIG. 2 is a diagram illustrating a configuration of a table of the packet transmitting apparatus according to the embodiment of the present invention.

In the above-described case in which the previous arrival group judging section 23 judges the ports to be included in the previous arrival port group on the basis of the difference between the arrival times of a single packet, the same type information table 29 and the previous arrival group information managing table 25 may not be separately provided, but a table integrating the two tables may be provided, as illustrated in FIG. 2. As illustrated in FIG. 2, a table 30 includes the same type information table 29 and the previous arrival group information managing table 25. The same type information table 29 stores hash values of the previous arrival packets and so forth as packet information.

Meanwhile, the previous arrival group information managing table 25 includes an arrival time table 31 and a fixed time table 32. The arrival time table 31 stores the arrival time of each the previous arrival packets. The fixed time table 32 stores fixed time information constituting the judging criterion for judging the previous arrival port group. For example, in the example illustrated in FIG. 2, a value "+50" is stored in the fixed time table 32. In the present example, therefore, the port at which the previous arrival packet has arrived and the port at which the later arrival packet has arrived within a unit time of 50 since the arrival of the previous arrival packet are included in the previous arrival port group.

Figure 3:
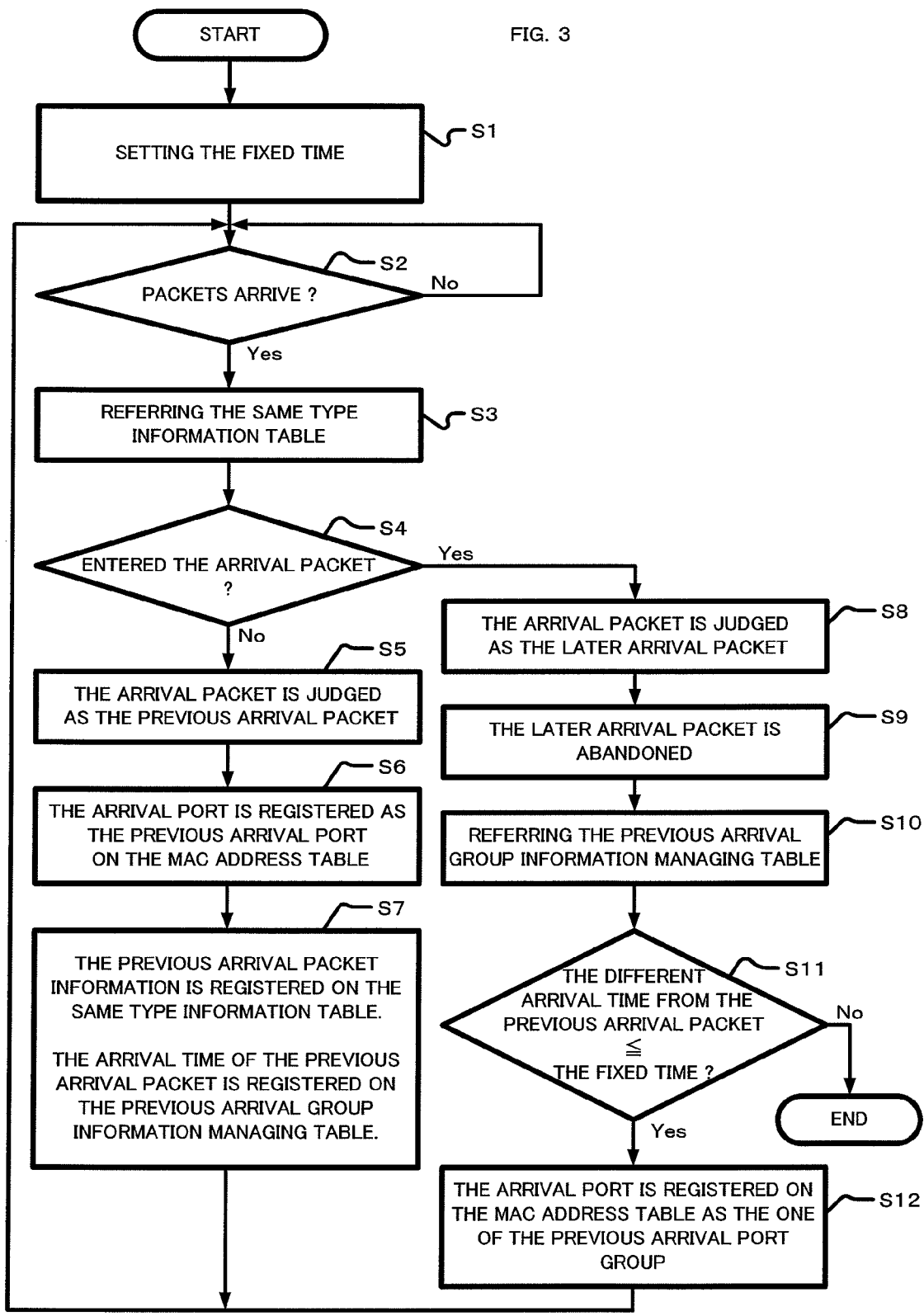
FIG. 3 is a flowchart illustrating the procedure of previous arrival port learning processing by the packet transmitting apparatus according to the embodiment of the present invention.

Description will now be made of the procedure of previous arrival port learning processing by the packet transmitting apparatus 21. FIG. 3 is a flowchart illustrating the procedure of the previous arrival port learning processing. Firstly, the information of the fixed time is set as a condition for detecting ports to be included in the previous arrival port group as the previous arrival ports (Step S1). The packet transmitting apparatus 21 stores the fixed time information in the previous arrival group information managing table 25. The packet transmitting apparatus 21 stands by in this state until the arrival of a packet at the packet transmitting apparatus 21 (No at Step S2).

When a packet arrives at one of the ports (Yes at Step S2), the arrived packet is passed to the packet processing section 24 via the packet sending and receiving section 22. The packet processing section 24 refers to the same type information table 29 (Step S3). If it is determined from the result of the reference that the same type information table 29 does not contain an entry of the arrived packet (No at Step S4), the packet processing section 24 judges the arrived packet as the previous arrival packet (Step S5).

Then, the packet processing section 24 registers the port at which the previous arrival packet has arrived, in the MAC address table 28, as the previous arrival port (Step S6). Further, the packet processing section 24 registers the information (e.g., the hash value) of the previous arrival packet in the same type information table 29. Furthermore, the packet processing section 24 retrieves the arrival time of the previous arrival packet from the timer 26, and registers the information of the time in the previous arrival group information managing table 25 (Step S7). Thereafter, the procedure returns to the stand-by state of Step S2 for the arrival of a packet.

Meanwhile, if it is determined from the result of the reference to the same type information table 29 that the same type information table 29 contains a corresponding entry (Yes at Step S4), the packet processing section 24 judges the arrived packet as the later arrival packet (Step S8), and abandons the packet (Step S9). Then, the packet processing section 24 retrieves the arrival time of the later arrival packet from the timer 26, and passes the information of the time to the previous arrival group judging section 23.

Further, the packet processing section 24 refers to the previous arrival group information managing table 25 (Step S10), and retrieves from the previous arrival group information managing table 25 the information of the arrival time of the previous arrival packet with respect to the arrival time of the later arrival packet and the information of the fixed time. Then, the packet processing section 24 passes the information of the arrival time of the previous arrival packet and the information of the fixed time to the previous arrival group judging section 23.

From the arrival time of the previous arrival packet and the arrival time of the later arrival packet, the previous arrival group judging section 23 calculates the difference in the arrival time of the later arrival packet, and judges whether or not the calculated time difference is within the fixed time (Step S11). If it is determined from the result of the judgment that the difference in the arrival time of the later arrival packet is within the fixed time (Yes at Step S11), the previous arrival group judging section 23 judges that the port at which the later arrival packet has arrived is equal to the previous arrival port.

On the basis of the result of the judgment, the packet processing unit 24 registers the port at which the later arrival packet has arrived, in the MAC address table 28, as one of the ports to be included in the previous arrival port group (Step S12). If the difference in the arrival time of the later arrival packet exceeds the fixed time (No at Step S11), the sequence of previous arrival port learning processing illustrated in FIG. 3 is completed. According to the above-described procedure, the previous arrival port group can be easily specified solely with a single packet in terms of the indicator of the time difference.

Figure 4:
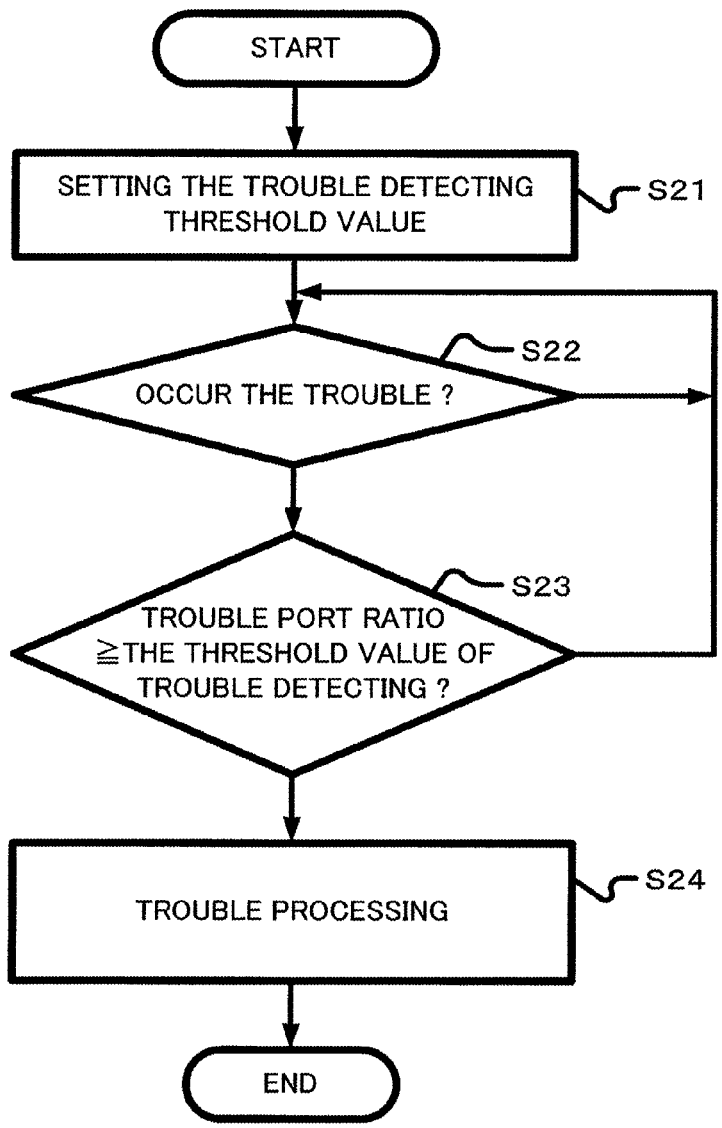
FIG. 4 is a flowchart illustrating the procedure of trouble judging processing by the packet transmitting apparatus according to the embodiment of the present invention.

Description will now be made of the procedure of processing for judging a trouble performed by the packet transmitting apparatus 21 (the trouble judging processing procedure). FIG. 4 is a flowchart illustrating the trouble judging processing procedure. Firstly, information of the trouble detection threshold value (the trouble detection threshold value information) is set as a condition for judging that the previous arrival port group has a path trouble (Step S21). The packet transmitting apparatus 21 stores the information of the threshold value for detecting the trouble (the trouble detection threshold value information) in the trouble occurrence judging section 27, for example. The packet transmitting apparatus 21 stands by in this state until a trouble occurs in one or more of the ports of the previous arrival port group (No at Step S22).

When a trouble occurs in one or more of the ports of the previous arrival port group (Yes at Step S22), the packet processing section 24 extracts from the MAC address table 28 the previous arrival port group including the one or more trouble ports, and passes the information of the ports included in the previous arrival port group to the trouble occurrence judging section 27. From the number of the ports included in the previous arrival port group including the one or more trouble ports and the number of the one or more trouble ports included in the previous arrival port group, the trouble occurrence judging section 27 calculates the ratio of the one or more trouble ports (the trouble port ratio). Then, the trouble occurrence judging section 27 judges whether or not the ratio is at least the trouble detection threshold value (Step S23).

If it is determined from the result of the judgment that the ratio of the one or more trouble ports does not reach the trouble detection threshold value (No at Step S23), the transmission of packets is performed through one or more ports in which a trouble has not occurred, until a further trouble occurs. Meanwhile, if it is determined that the ratio of the one or more trouble ports at the occurrence of the trouble is at least the trouble detection threshold value (Yes at Step S23), the trouble processing, such as the deletion of a corresponding entry from the MAC address table 28 and the notification of the occurrence of the trouble, is performed (Step S24). Then, the sequence of processing illustrated in FIG. 4 for judging a trouble is completed. According to the above-described procedure, in the event of a trouble state of the same level of seriousness, the path trouble can be judged for all source MAC addresses included in the previous arrival port group.

Description will now be made of a network system in which the packet transmitting apparatus 21 of the above-described configuration is disposed at each of nodes of a network. FIGS. 5 to 9 are diagrams for explaining the operation of the network system. As illustrated in the figures, it is assumed in the present example that four nodes A, B, C, and D constitute the network, although the configuration of the network is not particularly limited thereto. The packet transmitting apparatus disposed at each of the nodes is the same as the packet transmitting apparatus 21 illustrated in FIG. 1.

Further, it is assumed in a packet transmitting apparatus 43 of the node A that the first port of the apparatus is connected to a LAN_S41 including at least one terminal, and that the second and third ports of the apparatus are connected to the first port of a packet transmitting apparatus 44 of the node B and the first port of a packet transmitting apparatus 45 of the node C, respectively. Furthermore, it is assumed in a packet transmitting apparatus 46 of the node D that the first, second, and third ports of the apparatus are connected to the second port of the packet transmitting apparatus 44 of the node B, the second port of the packet transmitting apparatus 45 of the node C, and the third port of the packet transmitting apparatus 45 of the node C, respectively, and that the fourth port of the apparatus is connected to a LAN_T42 including at least one terminal.

Figure 5:
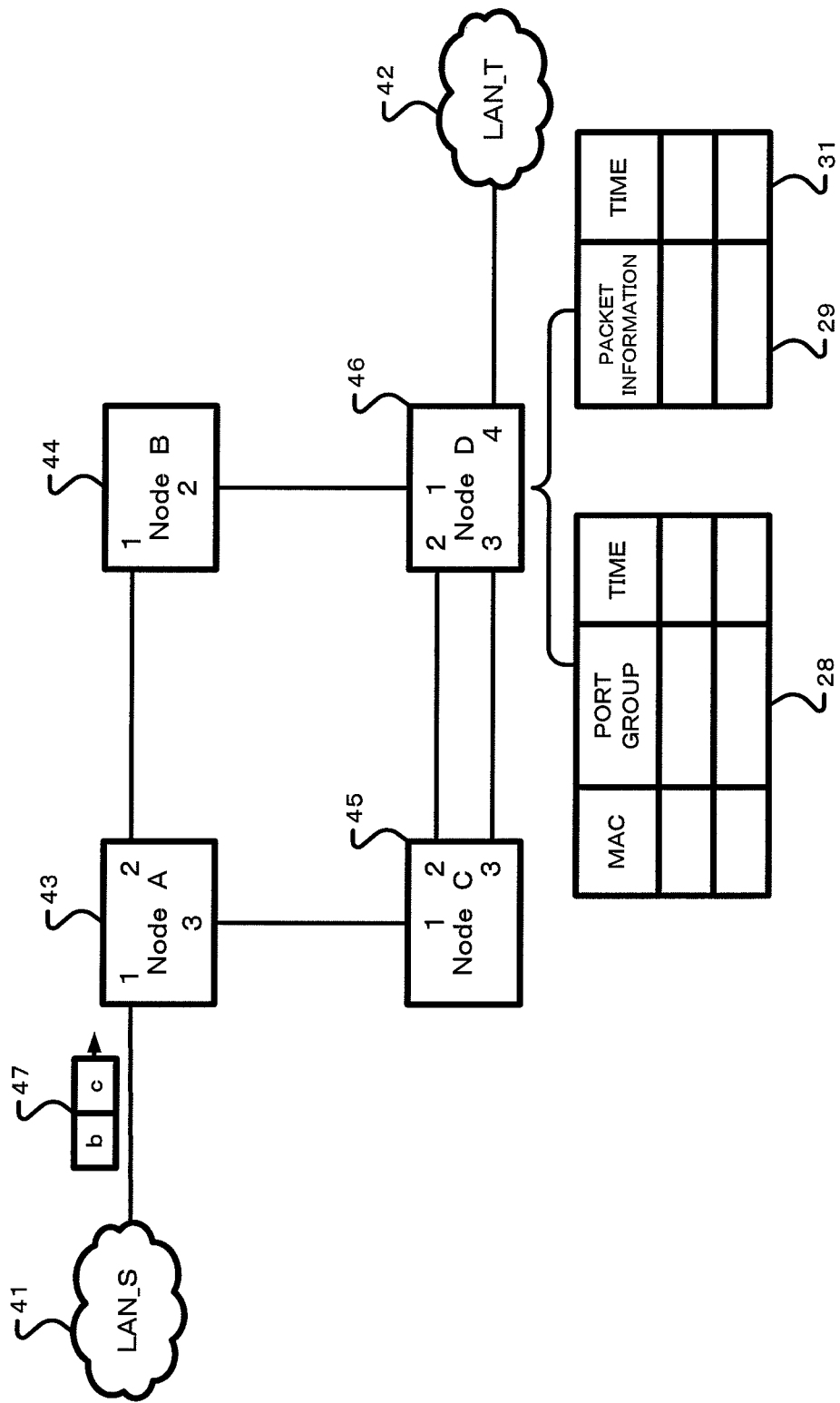
FIGS. 5 to 9 are diagrams illustrating the operation of a network system according to an embodiment of the present invention.

As illustrated in FIG. 5, the LAN_S41 transmits an unlearned packet 47 having a Destination MAC address (DA) of c and a Source MAC address (SA) of b. The packet transmitting apparatus 43 of the node A transmits the unlearned packet from the second and third ports of the apparatus to the nodes B and C, respectively.

Figure 6:
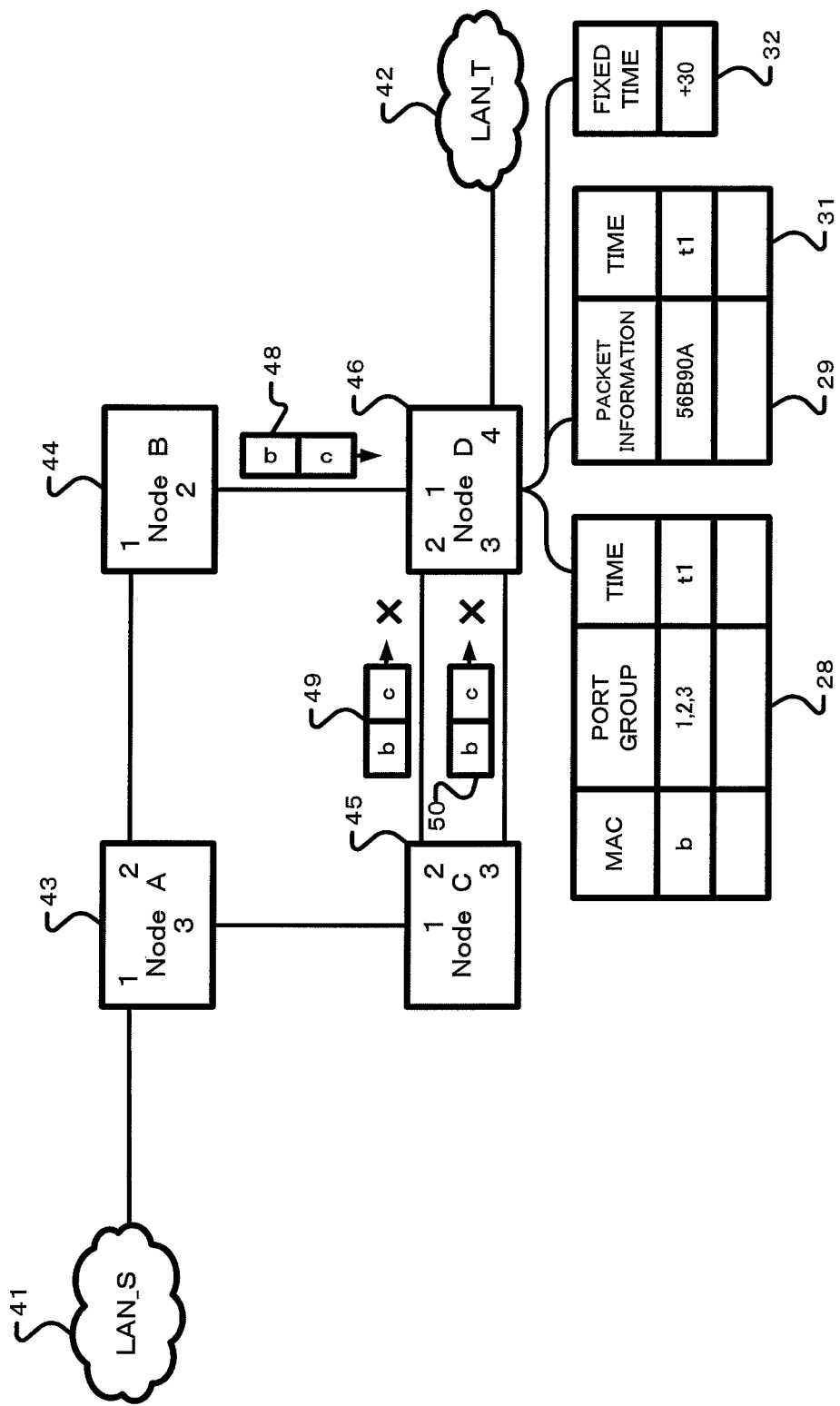

As illustrated in FIG. 6, the packet transmitting apparatus 44 of the node B transmits the thus transmitted unlearned packet from the second port of the apparatus to the node D. Meanwhile, the packet transmitting apparatus 45 of the node C transmits the thus transmitted unlearned packet from the second and third ports of the apparatus to the node D. Therefore, the same three packets 48, 49, and 50 arrive at the node D.

It is now assumed that the unlearned packet 48 has first arrived at the first port of the packet transmitting apparatus 46 of the node D. That is, the unlearned packet 48 which has arrived at the first port is the previous arrival packet. In this case, the packet transmitting apparatus 46 of the node D first registers the packet information, such as the hash value indicating the unlearned packet 48, and the arrival time (t1) of the packet in the same type information table 29.

Then, after a while, the same packets 49 and 50 as the unlearned packet 48 which has arrived at the first port arrive at the second and third ports of the packet transmitting apparatus 46 of the node D, respectively. The arrival times of the packets at the second and third ports are represented as t2 and t3, respectively.

The packet transmitting apparatus 46 of the node D compares the packets 49 and 50, which have arrived at the second and third ports of the apparatus, respectively, with the packet information stored in the same type information table 29. Then, the packet transmitting apparatus 46 judges whether each of the packets 49 and 50, which have arrived at the second and third ports of the apparatus, respectively, is the previous arrival packet or the later arrival packet. If each of the packets 49 and 50 is the later arrival packet, the packet transmitting apparatus 46 of the node D compares the arrival time of the later arrival packet with the arrival time of the previous arrival packet, and judges whether or not the difference between the times (the arrival time difference) is within a fixed time.

In the example illustrated in FIG. 6, the packet transmitting apparatus 46 judges whether or not each of the arrival time differences [t2−t1] and [t3−t1] is within a unit time of 30. If each of the arrival time differences is within the unit time of 30, the packet transmitting apparatus 46 of the node D learns that the previous arrival ports corresponding to the MAC address of b are the first, second, and third ports.

Figure 7:
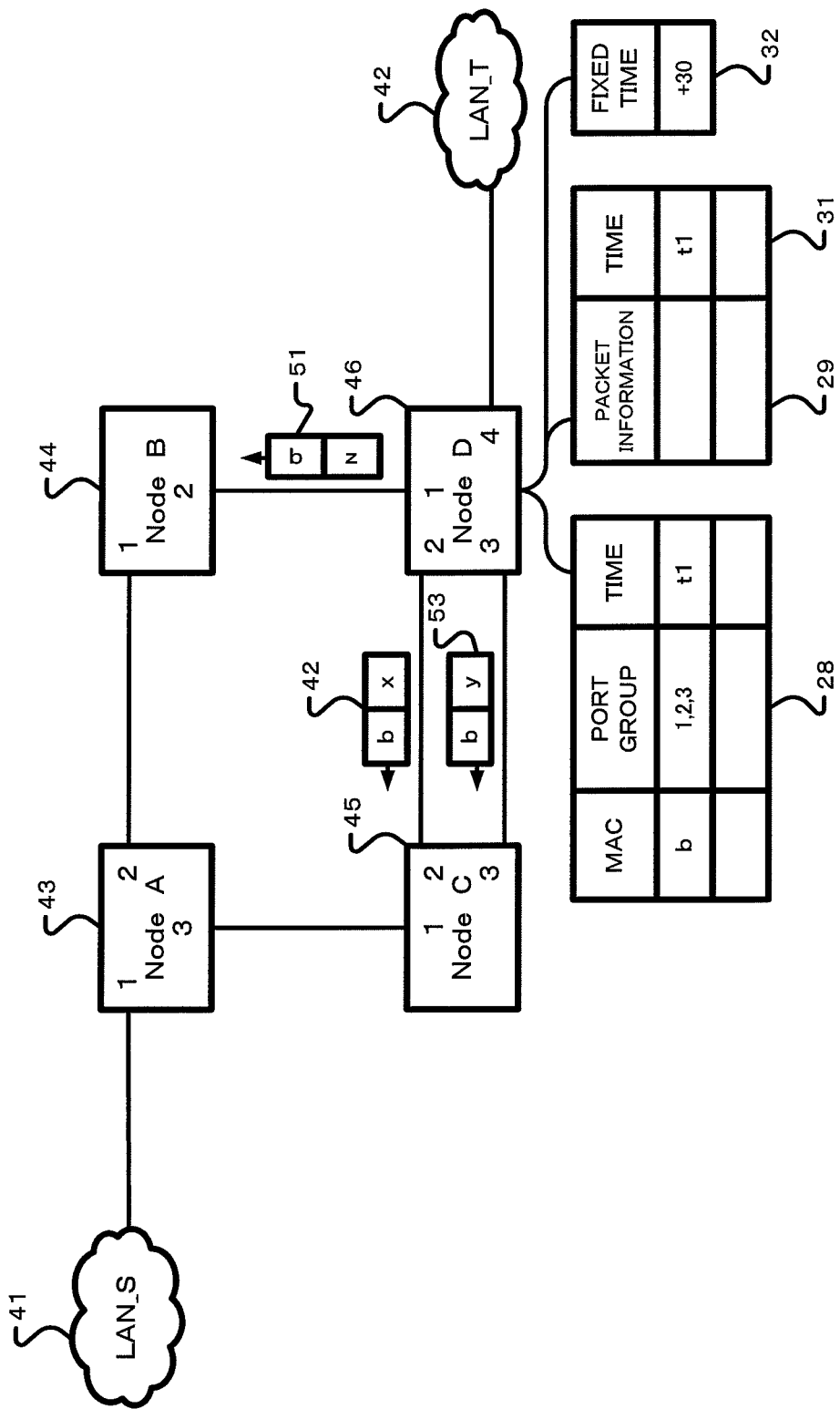

If a packet having a destination MAC address of b is transmitted from the LAN_T42 after the above learning, the packet is transmitted in a unicast manner to one of the first to third ports (the previous arrival port group) in the packet transmitting apparatus 46 of the node D, like one of the packets indicated by the reference numerals 51, 52, and 53 in FIG. 7. In the above process, to prevent the order of packets from being reversed, it is preferable to transmit the packets from the same path (port) in each flow.

Figure 8:
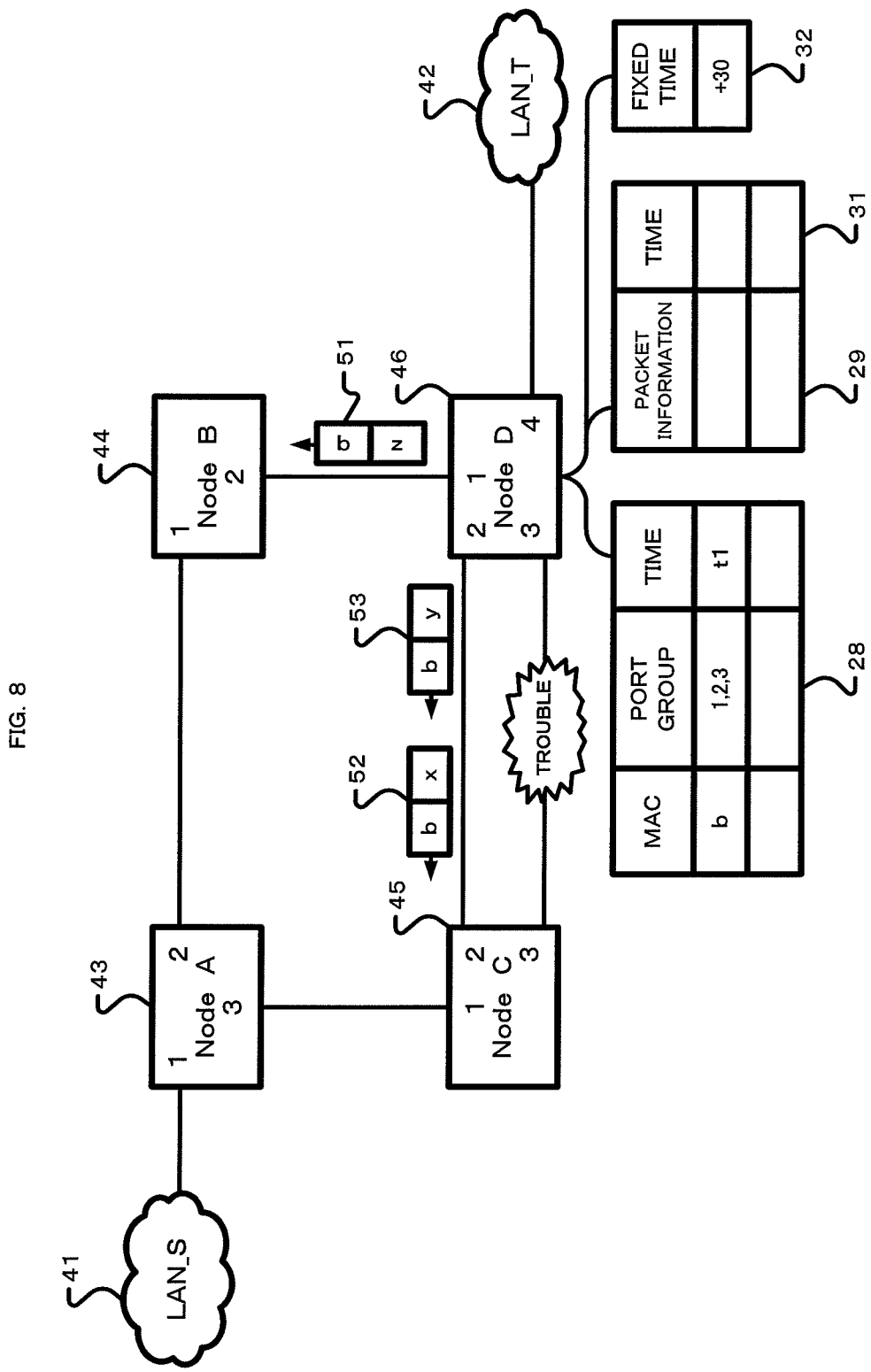

If a trouble occurs in one of the ports, the following operation takes place. It is now assumed that the trouble detection threshold value is set at 50%, for example. It is further assumed that a trouble occurs in a link connected to the third port of the packet transmitting apparatus 46 of the node D, as illustrated in FIG. 8. In this case, the previous arrival port group having the destination MAC address of b includes three ports. Thus, 33% of the links have the trouble.

In the above state, the ratio of the trouble port does not reach the trouble detection threshold value (50%). Thus, the packet transmitting apparatus 46 of the node D does not perform the trouble processing. However, the packet transmitting apparatus 46 of the node D knows that the third port of the apparatus is in a trouble state. Thus, the packet transmitting apparatus 46 transmits the packets 51, 52, and 53 having the destination MAC address of b from the first or second port of the apparatus.

Figure 9:
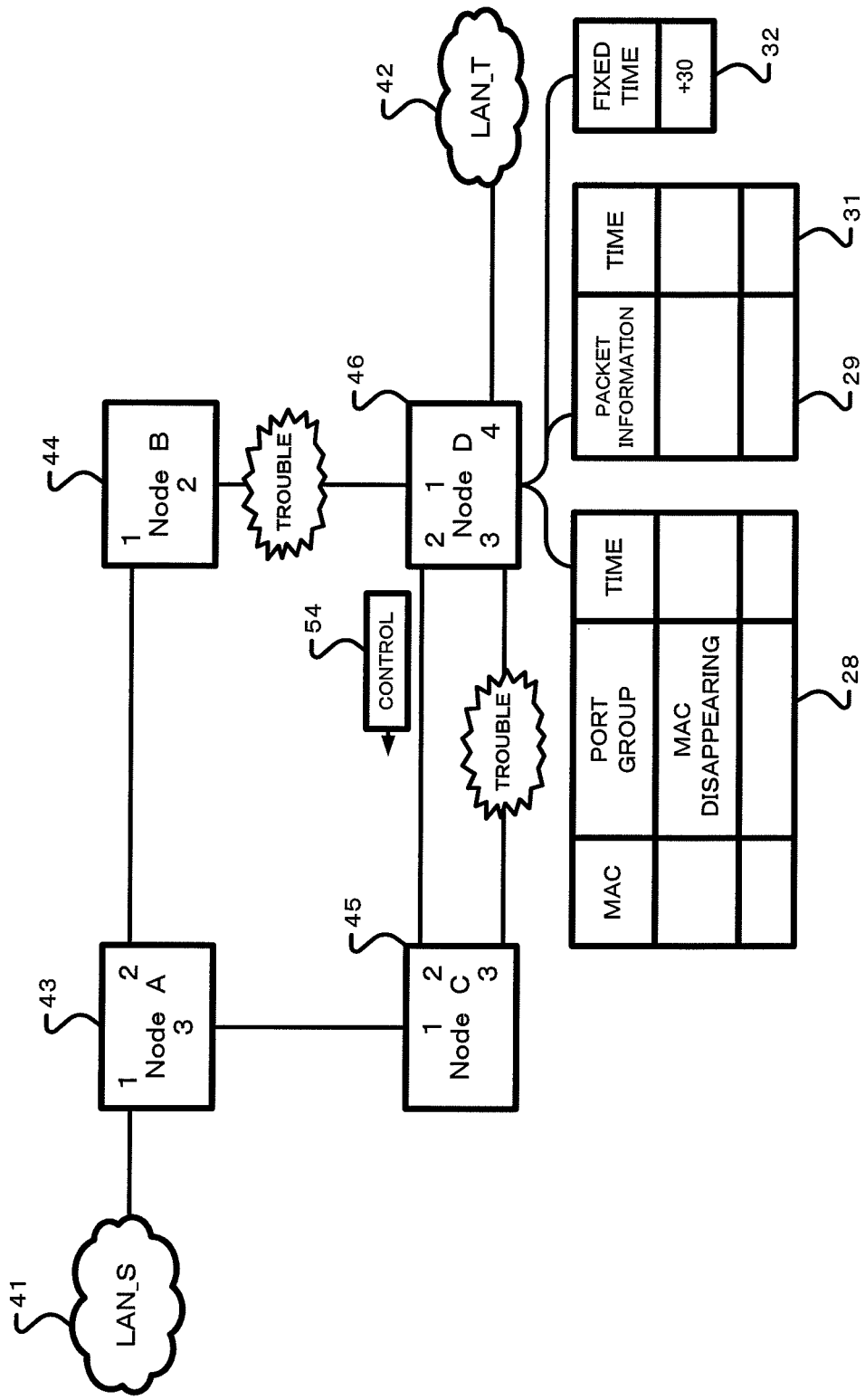
Figure 12:
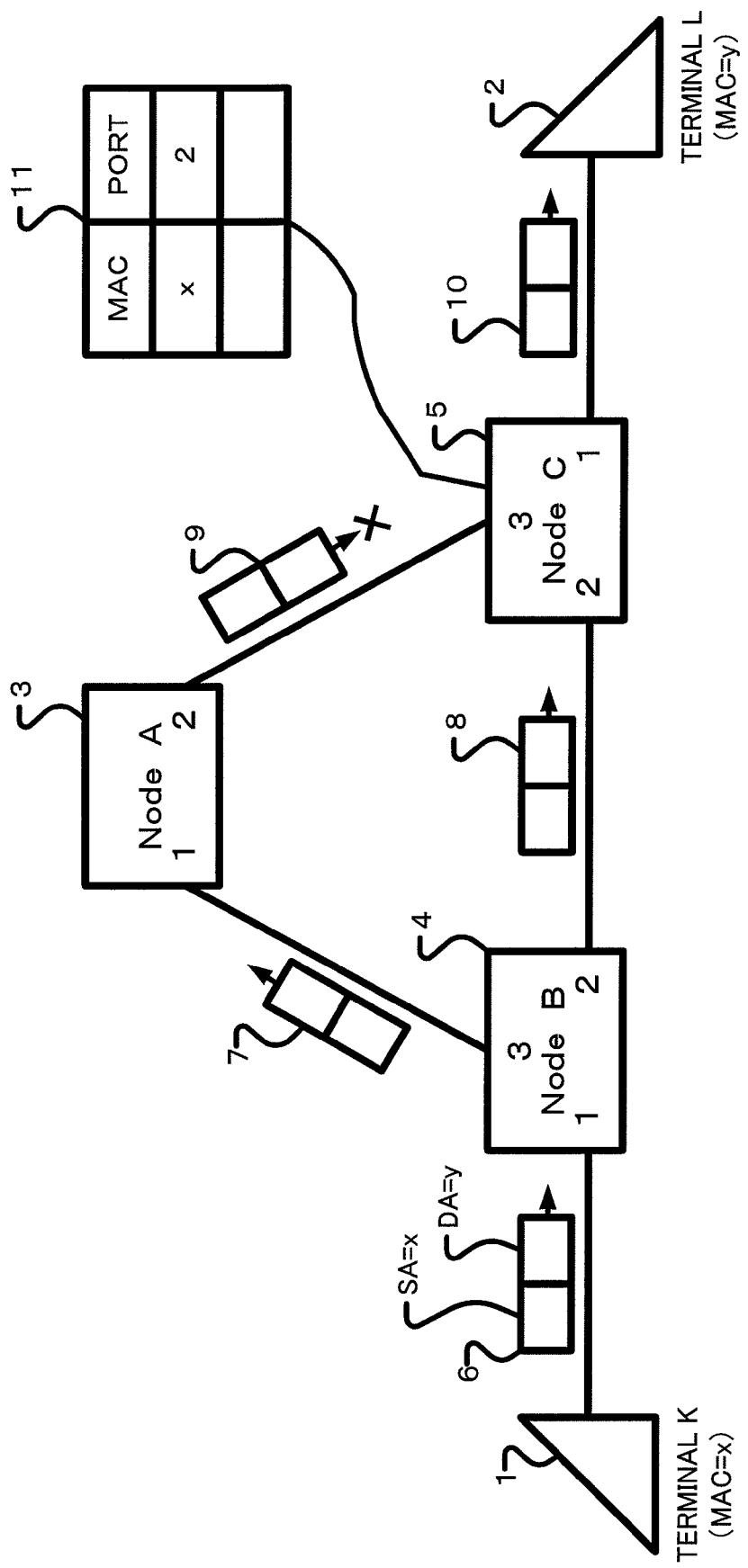
FIG. 12 is a diagram for explaining an outline of a conventional previous arrival port learning system.

As illustrated in FIG. 9, if a further trouble occurs in a link connected to the first port of the packet transmitting apparatus 46 of the node D, the ratio of the trouble ports is 67%, which exceeds the trouble detection threshold value (50%). Therefore, the packet transmitting apparatus 46 of the node D determines the above state as the occurrence of a trouble. Thus, the packet transmitting apparatus 46 transmits a control packet 54 from the second port of the apparatus, in which a trouble has not occurred, to notify the other nodes of the occurrence of the trouble. Further, the packet transmitting apparatus 46 deletes the learned information stored in the MAC address table 28.

The above configuration, in which the ports to be included in the previous arrival port group are judged on the basis of the arrival time difference of a single packet, may be modified such that a port is included in the previous arrival port group if the average value of the arrival time differences of a fixed number of packets (the average arrival time difference) at the port is within a fixed time. In this case, as well as the arrival time table 31 of the table 30 illustrated in FIG. 2, a table 60 illustrated in FIG. 10 is required to constitute the previous arrival group information managing table 25.

However, out of the tables illustrated in FIG. 2, the fixed time table 32 is unnecessary. In the present example, therefore, the previous arrival group information managing table 25 is configured such that the arrival time table 31 illustrated in FIG. 2 is added with the table 60 illustrated in FIG. 10. As illustrated in FIG. 10, the table 60 added to constitute the previous arrival group information managing table 25 includes an average arrival time difference table 61, a fixed number table 62, and a fixed time table 63.

The fixed number table 62 stores fixed number information for determining the timing of performing the judgment of the previous arrival port group. The fixed time table 63 stores fixed time information constituting the judging criterion for judging the previous arrival port group. The average arrival time difference table 61 stores, for each terminal MAC address, information of the number of arrivals of unlearned packets which have the same source MAC address but are different from one another, and information of the average value of the elapsed times since the arrival of the previous arrival packet until the arrival of the later arrival packet (the arrival time differences) of the unlearned packets which have arrived at each port (the average arrival time difference).

The average value of the arrival time differences at each port is calculated by the previous arrival group judging section 23. Upon every arrival of an unlearned packet, the previous arrival group judging section 23 calculates the arrival time difference for each single packet in accordance with the foregoing flowchart illustrating the procedure of the previous arrival port learning processing (see FIG. 3). Then, upon arrival of another unlearned packet having the same source MAC address, the previous arrival group judging section 23 calculates the average value of the arrival time differences for each port.

The previous arrival group judging section 23 determines the average value of the port having the smallest average value out of the average values of the respective ports, as zero, and calculates the differences from the value as the average values of the other ports. In the average arrival time difference table 61, therefore, the value of the port having the smallest average value of the arrival time differences is always zero, and the values of the other ports are represented as the differences from the value.

In the example illustrated in FIG. 10, for example, the fixed number table 62 and the fixed time table 63 store values "3" and "+50," respectively. Therefore, as for the MAC address for which three mutually different unlearned packets having the same source MAC address have arrived, the judgment of the previous arrival port group is performed at the time of the arrival of the three packets. Further, if the average value of the arrival time differences at a port is within the unit time of 50, the port is included in the previous arrival port group for the MAC address.

In the state illustrated in FIG. 10, the judgment of the previous arrival port group is performed for the MAC address of b. The previous arrival port group includes the first and second ports. As for the MAC address of x, the judgment of the previous arrival port group is performed at the time of arrival of one more unlearned packet having the source MAC address of x. According to the above configuration, the previous arrival port group can be more accurately specified in terms of the indicator of the time difference.

Further, the above configuration, in which the ports to be included in the previous arrival port group are judged on the basis of the arrival time difference or the average arrival time difference of unlearned packets, may be modified such that, for a plurality of mutually different unlearned packets having the same source MAC address, the ratio of arrivals of the previous arrival packets is calculated for each port, and that a port is included in the previous arrival port group if the thus calculated ratio of the port is at least a fixed value. In this case, a table 70 illustrated in FIG. 11 is required to constitute the previous arrival group information managing table 25.

The arrival time table 31 and the fixed time table 32 of the table 30 illustrated in FIG. 2 are unnecessary. Further, in the present example, time is not used as the judging criterion for judging the previous arrival characteristic. In the configuration of the packet transmitting apparatus 21 illustrated in FIG. 1, therefore, the timer 26 is unnecessary. The present example is similar in other configurations to the example illustrated in FIG. 1. However, the respective sections constituting the packet transmitting apparatus 21 do not perform interaction with the timer 26, time-related processing, and so forth.

As illustrated in FIG. 11, the table 70 constituting the previous arrival group information managing table 25 includes a previous arrival packet number table 71, a fixed number table 72, and a fixed ratio table 73. The fixed number table 72 stores fixed number information for determining the timing of performing the judgment of the previous arrival port group. The fixed ratio table 73 stores fixed ratio information constituting the judging criterion for judging the previous arrival port group.

The previous arrival packet number table 71 stores, for each terminal MAC address, information of the number of arrivals of unlearned packets which have the same source MAC address but are different from one another, and information of the number of the packets which have arrived at each port. Upon every arrival of an unlearned packet, a count is added to each of a counter for counting the number of arrivals of unlearned packets and a counter for counting the arrival ports, which correspond to the source MAC address of the packet. Therefore, the table 70 (the previous arrival group information managing table 25) has the function of managing means for managing the ratio of arrivals of packets for each port.

In the example illustrated in FIG. 11, for example, the fixed number table 72 and the fixed ratio table 73 store values "20" and "50%," respectively. Therefore, as for a MAC address for which twenty mutually different unlearned packets having the same source MAC address have arrived, the judgment of the previous arrival port group is performed at the time of the arrival of the twenty unlearned packets. Then, in the previous arrival port group for the MAC address, the ratio of the number of packets at each of the ports of the group with respect to the number of packets at the port having the largest number of packets is calculated, and it is judged whether or not the thus calculated ratio is at least 50%.

In the state illustrated in FIG. 11, the judgment of the previous arrival port group for the MAC address of x is performed as follows. The port having the largest number of packets is the first port. Therefore, using the first port as the reference, the previous arrival group judging section 23 calculates the ratio of the number of packets at the second port (eight) and the ratio of the number of packets at the third port (three), respectively, with respect to the number of packets at the first port (nine). As a result, 89% (=8/9×100%) is calculated as the ratio of the second port. Since the ratio exceeds 50%, the second port is included in the previous arrival port group.

Meanwhile, the ratio of the third port is 33% (=3/9×100%). Since the ratio does not reach 50%, the third port is not included in the previous arrival port group. Needless to say, the first port is included in the previous arrival port group. As for the MAC address of b, the judgment of the previous arrival port group is performed at the time of arrival of seven more unlearned packets having the source MAC address of b. According to the above configuration, the previous arrival characteristic does not involve the concept of time measurement. Therefore, the previous arrival port group can be specified even if the packet transmitting apparatus does not have the function for measuring the time difference, i.e., a timer.

Further, as the judging criterion for judging a path trouble in the previous arrival port group, the ratio of one or more trouble ports may be replaced by the number of one or more trouble ports. In this case, if a trouble occurs in at least fixed number of ports out of all ports included in a previous arrival port group, the trouble occurrence judging section 27 judges that the previous arrival port group has a path trouble. Information of the fixed number constituting the judging criterion used in the above judgment is previously stored in the trouble occurrence judging section 27. If the number of the ports included in the previous arrival port group is equal to or smaller than the fixed number, the trouble occurrence judging section 27 judges that the previous arrival port group has a path trouble when a trouble occurs in all of the ports included in the previous arrival port group.

As described above, according to the above embodiment, in the packet transmitting apparatus having the function of learning the optimal path in accordance with the previous arrival port learning system, a plurality of ports can be selected as the previous arrival ports and handled as the previous arrival port group. Accordingly, in the network system in which the packet transmitting apparatus is disposed at each of nodes, the load increased by the concentration of traffic and so forth can be dispersed.

The invention claimed is:

1. A packet transmitting apparatus comprising:
    a plurality of ports to transfer a packet from or to an external device;
    a packet processing unit operable to determine, when two or more packets having a same source-destination combination are received in two or more of the plurality of ports, a packet that is received earliest amongst the two or more packets having same source-destination combination in one of the plurality of ports as being a previous arrival packet;
    a previous arrival group judging unit operable to determine, as being previous arrival ports, two or more of the plurality of ports satisfying a previous arrival port condition in association with an elapsed time since a received time of a first packet determined as the previous arrival packet, used for determining the previous arrival ports; and
    a learning unit to learn an optimum path in accordance with a previous arrival port learning system that learns, as the previous arrival ports, the two or more of the plurality of ports satisfying the previous arrival port condition in which unlearned packets are received in association with a source address of the packet.

2. The packet transmitting apparatus according to claim 1, wherein, under the previous arrival port condition, the previous arrival ports include a first port at which the first packet determined to be the previous arrival packet by the packet processing unit is received, and a second port at which the same packet having the same source-destination combination as the first packet is received within a predetermined time since a received time of the first packet.

3. The packet transmitting apparatus according to claim 1, wherein, under the previous arrival port condition, when the elapsed time since a first received time of the first packet determined to be the previous arrival packet by the packet processing unit until a second received time of the same packet having the same source-destination combination as the first packet is calculated for each of a plurality of packets having a same source, and when an average of the elapsed time of the plurality of packets is calculated for each port, the previous arrival ports include one or more ports with the average of the elapsed time within a predetermined time.

4. The packet transmitting apparatus according to claim 2, further comprising:
    a timer unit operable to determine a time when a packet is received at a port.

5. The packet transmitting apparatus according to claim 4, further comprising:
    a managing unit operable to manage the elapsed time since a first received time of the first packet determined to be the previous arrival packet by the packet processing unit until a second received time of-the same-packet having the same source-destination combination as the first packet is calculated for each of a plurality of packets having a same source.

6. The packet transmitting apparatus according to claim 1, wherein, under the previous arrival port condition, when a ratio of a number of received packets having a same source to a number of the received packets of a port that receives a largest number of packets is calculated for each of the ports, the packets being determined to be the previous arrival packet by the packet processing unit, the previous arrival ports include a port where the calculated ratio is at least a predetermined value.

7. The packet transmitting apparatus according to claim 6, further comprising:
    a managing unit operable to manage the ratio for each of the ports.

8. The packet transmitting apparatus according to claim 1, further comprising:
    a trouble occurrence judging unit operable to determine that, when a trouble that occurs in a link connected to a port occurs in at least a predetermined ratio of the ports included in a previous arrival port group including the plurality of ports determined to be the previous arrival ports by the previous arrival group judging unit, the previous arrival port group has a path trouble.

9. The packet transmitting apparatus according to claim 1, further comprising:
    a trouble occurrence judging unit operable to determine that, when a trouble that occurs in a link connected to a port occurs in at least a predetermined number or all of the ports included in a previous arrival port group including the plurality of ports determined to be the previous arrival ports by the previous arrival group judging unit, the previous arrival port group has a path trouble.

10. A network system including a packet transmitting apparatus disposed at each of a plurality of nodes over a network, the network system comprising:
    a packet transmitting apparatus that comprises:
        a plurality of ports to transfer a packet from or to an external device;
        a packet processing unit operable to determine, when two or more packets having a same source-destination combination are received in two or more of the plurality of ports, a packet that is received earliest amongst the two or more packets having the same source-destination combination in one of the plurality of ports as being a previous arrival packet; and
        a previous arrival group judging unit operable to determine, as being previous arrival ports, two or more of the plurality of ports satisfying a previous arrival port condition in association with an elapsed time since a received time of a first packet determined as the previous arrival packet, used for determining the previous arrival ports; and
    a learning unit to learn an optimum path in accordance with a previous arrival port learning system that learns, as the previous arrival ports, the two or more of the plurality of ports satisfying the previous arrival port condition in which unlearned packets are received in association with a source address of the packet.

11. The network system according to claim 10,
wherein, under the previous arrival port condition, the previous arrival ports include a first port at which the first packet determined to be the previous arrival packet by the packet processing unit is received, and a second port at which the same packet having the same source-destination combination as the first packet is received within a predetermined time since a received time of the first packet.

12. The network system according to claim 10,
wherein, under the previous arrival port condition, when the elapsed time since a first received time of the first packet determined to be the previous arrival packet by the packet processing unit until a second received time of the same packet having the same source-destination combination as the first packet is calculated for each of a plurality of packets having a same source, and when an average of the elapsed time of the plurality of packets is calculated for each port, the previous arrival ports include one or more ports with the average of the elapsed time within a predetermined time.

13. The network system according to claim 11,
wherein the packet transmitting apparatus further comprises a timer unit operable to determine a time when a packet is received at a port.

14. The network system according to claim 13,
wherein the packet transmitting apparatus further comprises a managing unit operable to manage the elapsed time since the first received time of a first packet determined to be the previous arrival packet by the packet processing unit until a second received time of the same packet having the same source-destination combination as the first packet is calculated for each of a plurality of packets having a same source.

15. The network system according to claim 10,
wherein, under the previous arrival port condition, when a ratio of a number of received packets having a same source to a number of the received packets of a port that receives a largest number of packets is calculated for each of the ports, the packets being determined to be the previous arrival packet by the packet processing unit, the previous arrival ports include a port where the calculated ratio is at least a predetermined value.

16. The network system according to claim 15,
wherein the packet transmitting apparatus further comprises a managing unit operable to manage the ratio for each of the ports.

17. The network system according to claim 10,
wherein the packet transmitting apparatus further comprises a trouble occurrence judging unit operable to determine that, when a trouble that occurs in a link connected to a port occurs in at least a predetermined ratio of the ports included in a previous arrival port group including the plurality of ports determined as the previous arrival ports by the previous arrival group judging unit, the previous arrival port group has a path trouble.

18. The network system according to claim 10,
wherein the packet transmitting apparatus further comprises a trouble occurrence judging unit operable to determine that, when a trouble that occurs in a link connected to a port occurs in at least a predetermined number or all of the ports included in a previous arrival port group including the plurality of ports determined to be the previous arrival ports by the previous arrival group judging unit, the previous arrival port group has a path trouble.

* * * * *